March 27, 1956     J. H. MACKANESS ET AL     2,739,720
VEHICLE MOUNTED CRADLE FOR BAG LOADING APPARATUS
Filed Jan. 29, 1953     2 Sheets-Sheet 1

March 27, 1956   J. H. MACKANESS ET AL   2,739,720
VEHICLE MOUNTED CRADLE FOR BAG LOADING APPARATUS
Filed Jan. 29, 1953   2 Sheets-Sheet 2
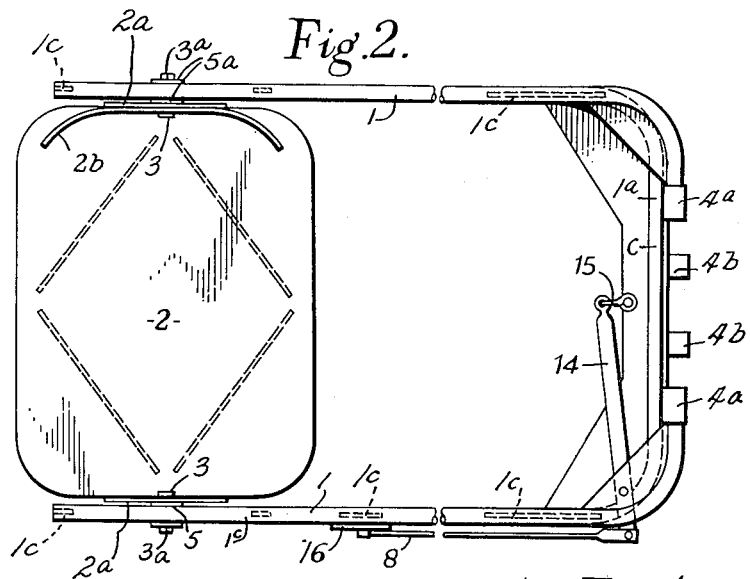
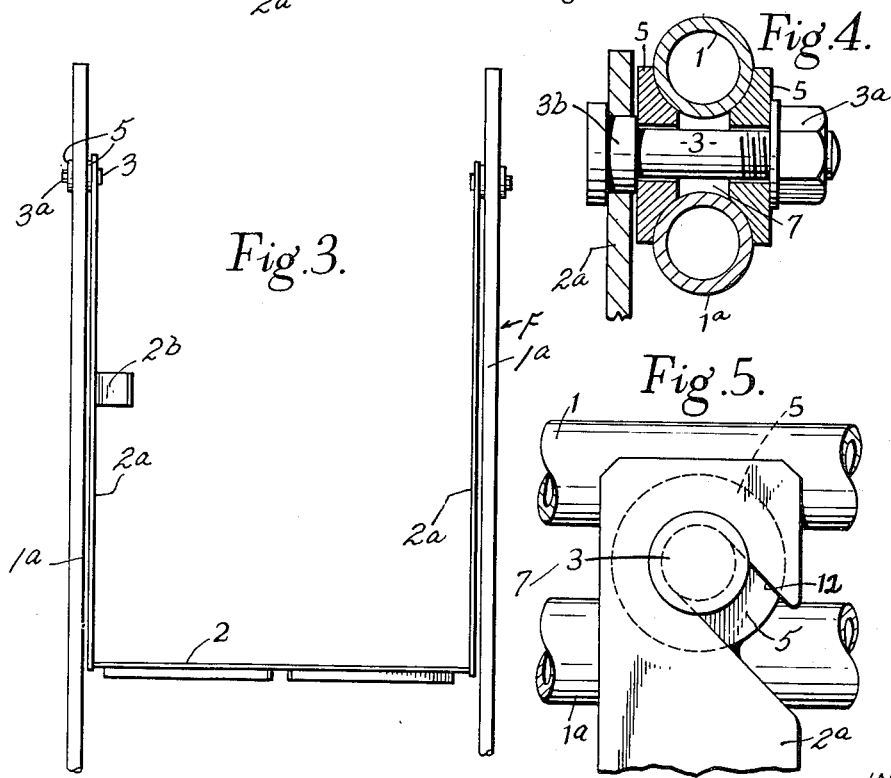

United States Patent Office 2,739,720
Patented Mar. 27, 1956

2,739,720

VEHICLE MOUNTED CRADLE FOR BAG LOADING APPARATUS

John H. Mackaness, Northampton, and John H. Morling, Little Billing, Northampton, England Application January 29, 1953, Serial No. 334,066

Claims priority, application Great Britain June 30, 1952

4 Claims. (Cl. 214—77)

This invention relates generally to bag loading apparatus such as is used for loading bags, sacks or other goods on motor lorries, trailers or other vehicles and more particularly to an improved cradle for use with apparatus of this kind. Examples of such apparatus are those referred to and described in our co-pending application No. 297,816 filed July 9, 1952.

A cradle of this kind ordinarily comprises a framework of inter-connected bars or tubes and is adapted to be pivotally coupled to the vehicle for swinging movement about one of its ends, the outer end part of the bars or tubes being shaped to carry a bag or other articles so that when the cradle is caused, by hydraulic, or other means on the vehicle, to swing about its pivoted end, the article is raised from ground level, to a loading height relative to the vehicle.

The known cradles of this kind are perfectly satisfactory for the loading of articles such as closed bags which can be laid across the platform on their sides, but are inherently unsuitable for the loading of open sacks or other articles which must necessarily be maintained in an upright position throughout the loading movement in order to avoid loss of their contents.

According to the present invention therefore a cradle for use with bag loading apparatus of the general kind referred to is characterised by the feature that it has a loading platform which is pivotally supported from the cradle frame or boom in order that the orientation of an article placed on the platform may be maintained constant during movement of the cradle between its lowered and raised positions and vice versa.

The loading platform is supported by means pivotally attached to the cradle frame and such means may consist of at least one hanger. It is also preferred that the point of suspension of the or each hanger from the cradle frame shall be adjustable longitudinally of the frame.

In one constructional form of the invention which is more fully described hereinafter the or each hanger is pivotally suspended upon a pin which is adjustably mounted in elongated slots located at each side of the cradle between the cradle frame members so as to permit the adjustment of the point of suspension of the or each hanger and hence the elevated position of the loading platform of the cradle relative to the floor of the vehicle with which it is used, means being provided for locking the pins in their adjusted positions.

Said means may for example consist of clamping washers fitted on the pins supporting the hangers and nuts threaded upon the pins.

In order that the hangers and the platform may be readily attached to or removed from the cradle frame the upper ends of the hangers may be formed with diagonally downwardly extending slots which are open at their lower ends and which are adapted to embrace the pivot pins.

The constructional form of the invention referred to above also includes a manually or foot operable lever which is mounted on the cradle frame and by means of which the raising and/or lowering of the cradle is initiated. In this construction also, the said lever is linked to the hydraulic mechanism (not shown) which actuates the cradle by linkage coupled to a draw bar on the vehicle upon which the loading apparatus is mounted, fully described and shown in our aforesaid co-pending application.

The invention will however be more clearly apparent from the following description of one particular form of cradle which is shown, by way of example, in the accompanying drawings, in which:

Figure 2 is a plan view of the cradle in its lowered position;

Figure 3 is an end elevation of the cradle in its raised position;

Figure 4 is a fragmentary sectional view showing the manner in which the load platform is suspended from the cradle frame; and Figure 5 is a side elevation showing the detachable nature of the hangers supporting the load platform.

Figure 1:
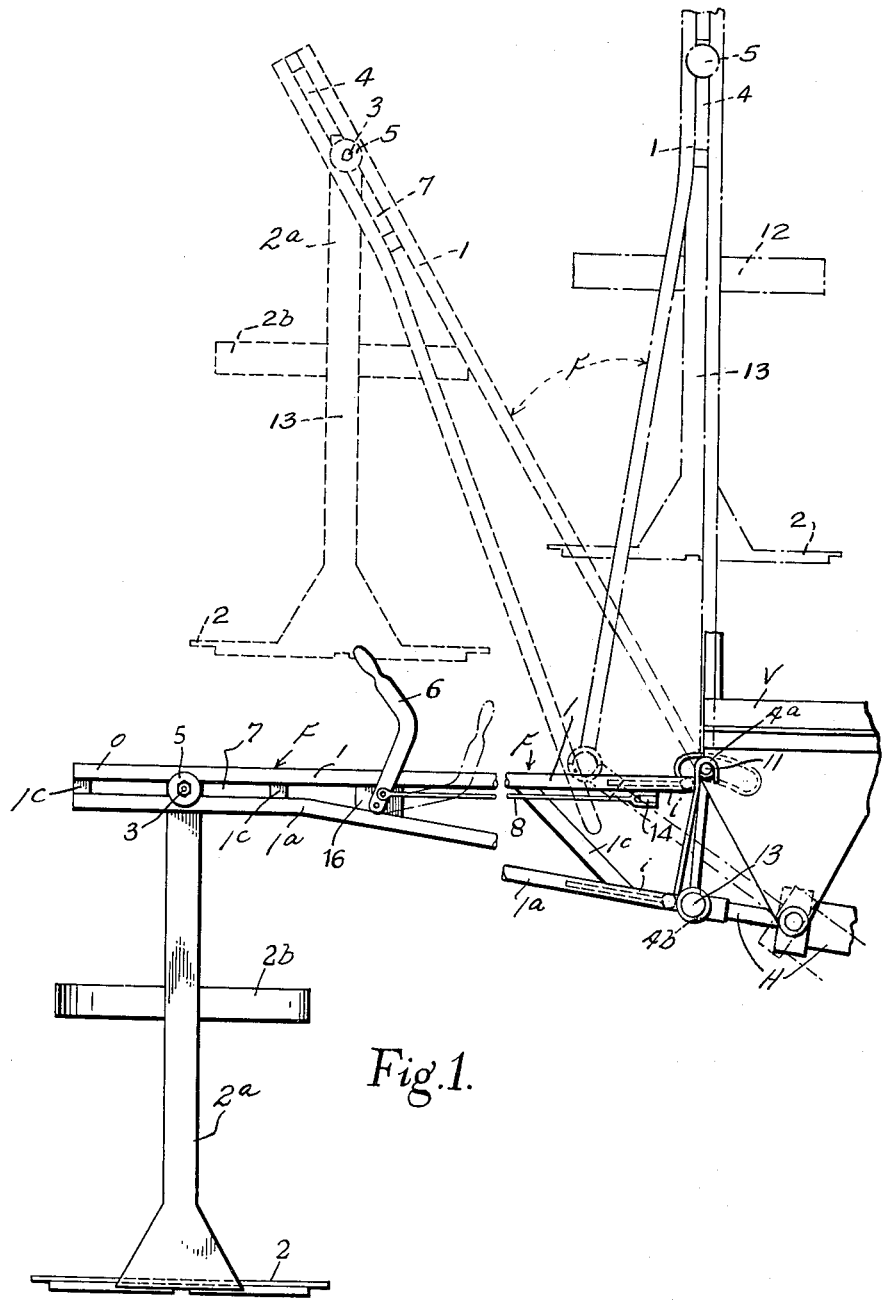
Figure 1 is a side elevation of the cradle showing successive positions in a lifting or lowering movement.

Referring now to the drawings, it will be seen that the cradle consists of a boom in the form of a U-shaped skeleton frame F of brazed tubular members, the inner end $i$ of which is mountable on a vehicle for hydraulic operation in the manner described in our co-pending application No. 297,816.

At the opposite or outer end $o$ of the cradle frame F, the loading platform, which is in the form of a flat plate 2, is supported at each side by a rigid hanger $2a$, the upper ends of the hangers being pivotally supported in elongated slots 7 provided in the outer end portions of each arm of said U-shaped cradle frame. Each arm of the frame F preferably comprises spaced elongated and substantially coextensive tubes 1 and $1a$ connected at intervals, as indicated at $1c$, by spacer members with their outer end portion parallel for a considerable distance of their length to form the slots 7 therebetween. The inner end portion of the tube $1a$ of each arm of the cradle frame, beyond the inner end of the slot 7, diverges obliquely and outwardly from its associated tube 1 and toward the inner end $i$ of the frame F, the cross member $c$ connecting the inner end of the tubes $1a$ being provided with curved pads or straddle-abutments $4b$ (similar to $4b$ in our aforesaid co-pending application) to engage over a cross-head shaft 13 of a hydraulic actuating mechanism H, described and shown in said co-pending application. The inner end of the tubes 1 of each arm of the cradle frame F is provided with hooked shaped bearings $4a$ (similar to $4a$ in our aforesaid co-pending application) to hook over and pivotally engage about the cross-shaft 11 of said hydraulic actuating mechanism and carried on the underside of the floor of a vehicle body V.

The points of suspension of the hangers $2a$ may be adjusted to any desired position longitudinally of the slots 7 and each may comprise a pair of clamping washers 5 fitted to opposite sides of the tube member 1 and $1a$ and bridging the slots 7 therebetween (see Figs. 4 and 5), each pair of clamps being held in clamping position by a headed bolt 3 and nut $3a$ passing through apertures in the washers 5 and through the slot 7. The bolts 3 have a spacing collar $3b$ under their heads to provide a pivot bearing surface for the hangers $2a$ respectively.

In order that the cradle may be readily attached to and removed from the cradle frame F, the upper end of each hanger $2a$ is formed with a diagonally extending slot 12 (see Fig. 5) which is open at its lower end to receive and hook-over the collar $3b$ on a bolt 3, the inner end of the slot 12 being curved to conform with the bearing surface on said collar. Thus, the hangers 2a may be dropped onto the pivot pin 3 or readily removed when required. A curved retaining strap or guard 2b is carried by at least one of the hangers 2a at a point above the platform 2 for purpose of preventing tipping of an open sack or other article supported on the platform.

Also mounted between the main frame members 1 and 1a on one side of the cradle is an operating lever 6 which is pivotally mounted on a bracket 16 and is linked to the hydraulic loader actuating mechanism by means of a rod 8 and lever 14 coupled to a draw bar (not shown) on the vehicle by means of a snap hook 15.

This operating lever 6 is manually or foot operable and is adapted to be thrown over so as to initiate the lifting operating and to remain in such position until the cradle is fully raised. When the load is removed from the cradle the operating lever 6 is returned to a raised position by the operator receiving the load. The cradle including the loading platform 2 then return to the ground level by gravity in readiness for the next loading operation.

As the cradle tilts about its inner end the loading platform 2, the hangers being pivoted, remains horizontal throughout and swings through the cradle frame in the course of its upward and downward movement.

It should be understood that the improved cradle described above is one which is at present preferred and is described only by way of example, various modifications being possible. By use of the improved cradle as described however, goods of all kinds including open sacks and liquid containers can be loaded from ground level to the level of the vehicle floor in an upright position or to selected levels above the vehicle floor.

We claim:

1. In a bag loading device for ready attachment and detachment with a vehicle, a cradle comprising a platform and an upwardly extending rigid hanger fixedly connected thereto; a supporting boom for said cradle comprising a pair of connected and spaced elongated substantially coextensive members and disposed in substantially a vertical plane to form a skeleton frame, said members having portions thereof at one end of the boom parallel for a considerable distance of their length to form a slot therebetween extending longitudinally of the boom and their other portion diverging, means on the diverging end of one of said members for quick pivotal attachment and detachment with the vehicle and means on the other of said diverging ends for abutment engagement with an actuator; and means fixedly adjustable in and along the length of said slot and to which the upper end of its hanger is pivotally connected for swingably suspending said platform from said boom and maintaining constant the orientation of the article placed on the platform during movement of the cradle.

2. The subject-matter of claim 1 wherein the boom is a substantially U-shaped frame with said slots provided in the outer end portions of the arms of said frame and with the attachment means and actuator abutment means being at the closed ends of the elongated members comprising the frame; and there being a hanger on each side of the platform for connection with an arm, respectively, of said frame.

3. The subject-matter of claim 1 wherein the means adjustable in and along the said slot for pivotally suspending the platform comprises two clamping washers displaceably arranged on each side of the parallel portions of said elongated members and bridging the slot formed thereby and shaped to conform to the profile of said members, a headed bolt passing through said washers and said slot and retaining said washers in clamped adjusted position on said members by a nut threaded on said bolt, and a spacer under the head of said bolt in contact with one of said washers and having an exterior pivot bearing surface upon which said hanger pivots.

4. The subject-matter of claim 3 wherein the upper end of the hanger has a pivot aperture therein to receive said spacer and a slot extending diagonally downwardly therefrom and open at its lower end, and dimensioned to permit the spacer to pass therethrough whereby the hanger may be quickly attached in and removed from suspended position on said boom.

References Cited in the file of this patent

UNITED STATES PATENTS

| 893,491 | Hansen | July 14, 1908 |
| 2,033,243 | Jester | Mar. 10, 1936 |
| 2,099,998 | Berg | Nov. 23, 1937 |
| 2,386,216 | Hay | Oct. 9, 1945 |
| 2,433,598 | Chadwick, Jr. | Dec. 30, 1947 |
| 2,464,071 | Coffing | Mar. 8, 1949 |

FOREIGN PATENTS

| 476,250 | Germany | May 15, 1929 |